(12) United States Patent
Stauffer

(10) Patent No.: US 8,940,445 B2
(45) Date of Patent: Jan. 27, 2015

(54) VANADIUM-ZINC BATTERY

(76) Inventor: John E. Stauffer, Greenwich, CT (US)

( * ) Notice: Subject to any disclaimer, the term of this patent is extended or adjusted under 35 U.S.C. 154(b) by 209 days.

(21) Appl. No.: 13/458,017

(22) Filed: Apr. 27, 2012

(65) Prior Publication Data

US 2013/0288135 A1  Oct. 31, 2013

(51) Int. Cl.
*H01M 10/056* (2010.01)
*H01M 10/0569* (2010.01)
*H01M 10/05* (2010.01)
*H01M 10/0568* (2010.01)

(52) U.S. Cl.
CPC .......... *H01M 10/0569* (2013.01); *H01M 10/05* (2013.01); *H01M 10/0568* (2013.01)
USPC ........................................ 429/324

(58) Field of Classification Search
CPC ......... H01M 4/02; H01M 4/621; H01M 4/86; H01M 4/13; H01M 4/62; H01M 4/139; H01M 4/622; H01M 4/623; H01M 4/661; H01M 4/663; H01M 4/664; H01M 4/70; H01M 10/0436; H01M 10/052; H01M 10/056; H01M 10/0565; H01M 10/06; H01M 10/24; H01M 10/36; H01M 2/145; H01M 2/1653; H01M 2/1686; H01M 2/18; H01M 6/40; H01M 6/14; H01M 6/181; H01M 6/30; H01M 8/188; H01M 8/20; H01M 8/0206; H01M 8/0213; H01M 8/0215; H01M 8/0247; H01M 8/1002; H01M 8/186; H01M 8/22; H01M 12/065; H01M 12/02; H01M 12/04; H01M 2300/0014; H01M 2300/0025; H01M 2300/0085; H01M 10/05; H01M 10/0569; H01M 10/0568; H01M 2300/0028; H01G 11/26; H01G 11/02; H01G 11/10; H01G 11/46; H05K 5/00; B32B 3/06; B32B 3/30; C08L 101/10; C08L 101/00
USPC .............. 429/324, 245, 218.1, 249, 306, 482, 429/523, 528, 206, 405, 406, 209, 450, 477, 429/530; 252/62.2
See application file for complete search history.

(56) References Cited

U.S. PATENT DOCUMENTS

| | | | | |
|---|---|---|---|---|
| 3,170,820 | A * | 2/1965 | Drengler et al. | 264/104 |
| 3,976,509 | A * | 8/1976 | Tsai et al. | 429/341 |
| 7,947,391 | B2 * | 5/2011 | Stauffer | 429/206 |
| 2008/0096078 | A1 * | 4/2008 | Miyake | 429/33 |
| 2010/0099018 | A1 | 4/2010 | Kawase et al. | |
| 2011/0171536 | A1 | 7/2011 | Oki et al. | |
| 2011/0262803 | A1 * | 10/2011 | Huang et al. | 429/206 |

OTHER PUBLICATIONS

CAMEO Chemicals (polypropylene glycol). http://cameochemicals.noaa.gov/chemical/9002, Date Unknown.*
Chemical Book. 2008. Poly(propylene glycol) Basic information. http://www.chemicalbook.com/ProductChemicalPropertiesCB4123367_EN.htm.*

* cited by examiner

*Primary Examiner* — Sarah A Slifka
*Assistant Examiner* — Anne R Dixon
(74) *Attorney, Agent, or Firm* — Young Basile Hanlon & MacFarlane PC

(57) ABSTRACT

A storage battery is provided comprising a positive electrode of vanadium, a negative electrode of zinc, and an electrolyte of potassium hydroxide dissolved in alcohol or glycol. Upon charging, the vanadium oxidizes to vanadium pentoxide and zinc oxide is reduced to the metal. The reverse reactions occur during discharge.

3 Claims, 1 Drawing Sheet

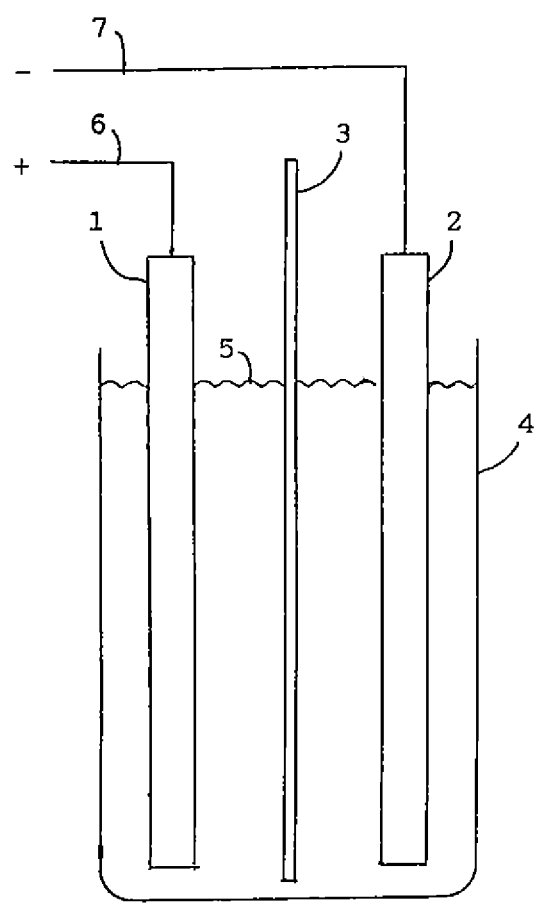

VANADIUM-ZINC BATTERY

FIELD OF THE INVENTION

The invention relates to a storage battery that is distinguished by its unique electrochemistry; i.e., the positive electrode is fabricated from a vanadium material; the negative electrode is made at least in part of zinc; and the electrolyte comprises an alcohol or glycol solution of potassium hydroxide. Upon charging the battery, vanadium is oxidized and zinc is reduced. The reverse reactions take place on discharge.

BACKGROUND OF THE INVENTION

For over twenty-five years, vanadium has been considered for use in flow batteries. In this design, two electrolyte solutions, each containing vanadium ions, are pumped through a cell where some of the ions are reduced and others are oxidized to produce an electrical potential. By reversing this process the battery is recharged.

The concept of a flow battery containing vanadium is of interest because of the chemical properties of vanadium. A number of problems, however, have held back the commercialization of this technology. While vanadium salts are soluble in water, their limited concentrations restrict the energy density of the battery. Furthermore, a cumbersome arrangement of holding tanks and pumps add to the bulk of the system, reducing its appeal.

SUMMARY OF THE INVENTION

The present invention is a rechargeable battery in which the positive electrode consists of a vanadium material and the negative electrode is based on zinc. The electrolyte comprises an alcohol or glycol solution of potassium hydroxide.

Upon charging the battery, vanadium is oxidized to various oxides or hydroxides of the metal. At the same time, zinc oxide or hydroxide is reduced to elemental zinc. The reverse reactions occur when the battery is discharged.

Any of several alcohols can be employed in the electrolyte, including methanol, ethanol, propanol and butanol. Also, various glycols can be used, such as 1,3 propanediol; 1,3 butanediol; and 1,4 butanediol. In addition, any mix of these solvents is suitable.

Alkalinity is provided by potassium hydroxide dissolved in one of the disclosed organic solvents. This is the preferred hydroxide although in certain applications sodium hydroxide or cesium hydroxide also may be used.

A conventional battery design is disclosed for the present invention. A membrane or divider is contemplated to separate the positive and negative electrodes. This feature is especially advantageous in compact batteries designed to improve the energy density.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying photographs, the latter being briefly described hereinafter.

BRIEF SUMMARY OF THE DRAWINGS

The description herein makes reference to the accompanying drawing wherein:

The single FIGURE is a diagrammatic view of an experimental battery according to the present invention. It shows the relationship of the principal components.

DETAILED DESCRIPTION OF THE ILLUSTRATIVE EMBODIMENT

The present invention is predicated on the several oxidation states of vanadium, specifically +2, +3, +4 and +5. The versatility imparted by this chemistry is significant. Thus, when vanadium is oxidized it can form any one of four different oxides.

In the battery of the present invention, the positive electrode 1 is fabricated from vanadium. When this metal is completely oxidized, it forms vanadium pentoxide with a valence of +5. Upon reduction, vanadium reverts to +3 although it may exist in the +4 state as an intermediary.

The negative electrode 2 comprises zinc metal. When the battery is discharged, zinc is oxidized first to zinc hydroxide and, depending on the conditions of the battery, to zinc oxide. The reverse reaction takes place on charging.

The following set of equations postulate the electrochemical reactions in more detail as they occur during discharge. At the positive electrode:

$$V(OH)_5 + 2\ e^- \rightarrow V(OH)_5 + 2\ OH^- \qquad 1.36\ v.$$

and at the negative electrode:

$$Zn + 2OH^- \rightarrow Zn(OH)_2 + 2e^- \qquad 1.24\ v.$$

When the above two equations are combined, the following reaction is obtained, which represents the overall operation of the battery:

$$V(OH)_5 + Zn \rightarrow V(OH)_3 + Zn(OH)_2 \qquad 2.60\ v.$$

As seen by the above expression, the oxidation of the zinc is balanced by the reduction of the vanadium. When the battery is charged, the reverse reaction takes place. The theoretical open circuit voltage of the cell, namely, 2.60 volts is determined by the sum of the two electrode potentials.

An important feature of the battery is the composition of the electrolyte. Because vanadium salts are quite soluble in water, aqueous electrolytes are precluded from consideration. For example, vanadium pentoxide dissolves in highly acidic solutions to give various ions. In basic solution, vanadium pentoxide dissolves forming vanadate anions.

Given the ineffectiveness of aqueous systems, a decision was made to use organic solvents. The hydroxides of the alkali metals, with the exception of lithium, are quite soluble in alcohols as well as in glycols. Notably, the solubility of potassium hydroxide is significantly greater than sodium hydroxide, and is preferred in this application.

The present combination deals effectively with the stability of the organic solvents; i.e., vanadium pentoxide is a strong oxidizing agent. Experimental studies show that the structure of the solvent is important. Vanadium pentoxide reacts with ethylene glycol as well as other diols where the hydroxyl groups are attached to neighboring carbon atoms. On the other hand, 1,3 propanediol provides relatively good stability.

It has also been determined that cesium is not an effective candidate for the electrolyte. Quite significantly, it is found that whereas a methanol solution of potassium hydroxide serves as an effective electrolyte, a methanol solution of cesium carbonate is not effective. It appears that the cesium ion increases the activity of vanadium pentoxide causing it to oxidize the alcohol.

The net result is that a few combinations of alkali and solvents are effective. This study is not exhaustive, however, and therefore other compositions might prove to be advantageous. In summary, the success of a vanadium-zinc battery depends in large measure of the selection of the electrolyte.

FIG. 1 is a drawing showing the features of an experimental cell. The positive electrode 1 is a rod of vanadium and negative electrode 2 is a rod of zinc. Spacer 3 is a plastic sheet designed to keep the electrodes from touching. The above elements are placed in glass jar 4, which holds the electrolyte 5. Positive and negative leads 6 and 7 are connected to the battery.

A commercial grade of vanadium-zinc battery has definite merit. All components of the battery, including vanadium, zinc, alcohol or glycol and potassium hydroxide, are benign. Furthermore, they are readily available in commerce at competitive prices. Finally, the energy density of this battery is superior to many of those in common use.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

EXAMPLES

1. A battery was assembled from a glass jar 2 in. in diameter by 4 in. high. The positive electrode was a rod of vanadium 99.5% (metals basis) ½ in. in diameter by 4 in. long. The negative electrode was a rod of zinc 99.9+% (metals basis) ½ in. in diameter by 6 in. long. The electrolyte was prepared by dissolving 25.0 gm. of potassium hydroxide ACS in 200 ml. 1-propanol ACS 99.5+%. After charging the battery for seven minutes at 20 volts, an open circuit voltage of 2.55 volts was achieved for the cell.

2. The same battery was used in an example 1 except the electrolyte was prepared by dissolving 23.1 gm. potassium hydroxide ACS in 200 ml. 1,3 propanediol 99%. In this case, an open circuit voltage of 2.41 volts was obtained after charging the cell for eight minutes at 8 volts.

What is claimed is:

1. A storage battery comprising:
   i. a positive electrode consisting of vanadium;
   ii. a negative electrode consisting of zinc; and
   iii. an electrolyte consisting of potassium hydroxide dissolved in 1,3 propanediol 99%.

2. A storage battery comprising:
   a positive electrode consisting essentially of vanadium;
   a negative electrode consisting essentially of zinc; and
   a non-aqueous electrolyte consisting essentially of potassium hydroxide and a glycol solvent, the electrolyte in direct contact with the vanadium and the zinc.

3. A storage battery of claim 2 in which the glycol solvent is 1,3 propanediol.

* * * * *